C. H. DRAPER & J. NORTHROP.
FILLING FEELER MECHANISM.
APPLICATION FILED MAY 19, 1916.

1,249,047.

Patented Dec. 4, 1917.

Witness:
Jas. J. Maloney.

Inventors:
Clare H. Draper
Jonas Northrop
by their attorneys

UNITED STATES PATENT OFFICE.

CLARE H. DRAPER AND JONAS NORTHROP, OF HOPEDALE, MASSACHUSETTS, ASSIGNORS TO HOPEDALE MANUFACTURING COMPANY, OF MILFORD, MASSACHUSETTS, A CORPORATION OF MASSACHUSETTS.

FILLING-FEELER MECHANISM.

1,249,047.  Specification of Letters Patent.  Patented Dec. 4, 1917.

Application filed May 19, 1916. Serial No. 98,567.

*To all whom it may concern:*

Be it known that we, CLARE H. DRAPER and JONAS NORTHROP, citizens of the United States, residing at Hopedale, in the county of Worcester and Commonwealth of Massachusetts, have invented certain new and useful Improvements in Filling-Feeler Mechanisms; and we do hereby declare the following to be a full, clear, and exact description of the invention such as will enable others skilled in the art to which it appertains to make and use the same.

The present invention relates to an improvement in filling feeler mechanisms for looms.

The object of the invention is to produce a filling feeler mechanism of improved construction such that it will accurately and uniformly determine critical exhaustion of filling, means being provided for positively preventing the mechanism from effecting a change in the operation of the loom until the filling is critically exhausted. To the accomplishment of this object the invention consists in the improved filling feeler mechanism hereinafter described and particularly pointed out in the claims.

Figure 1:
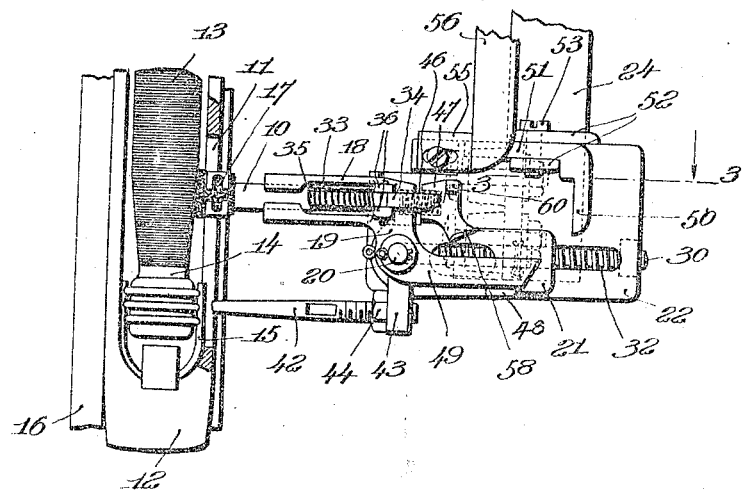
Figure 2:
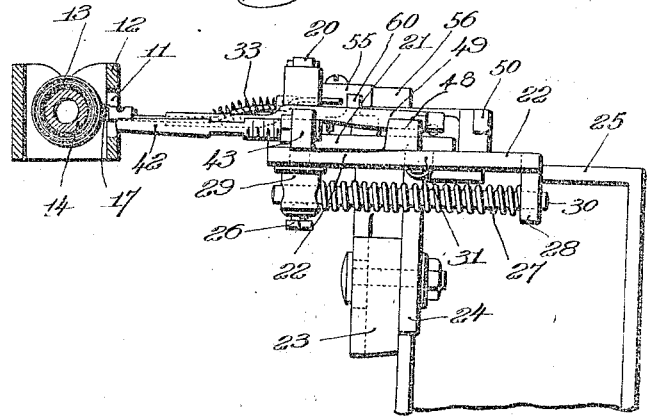
Figure 3:
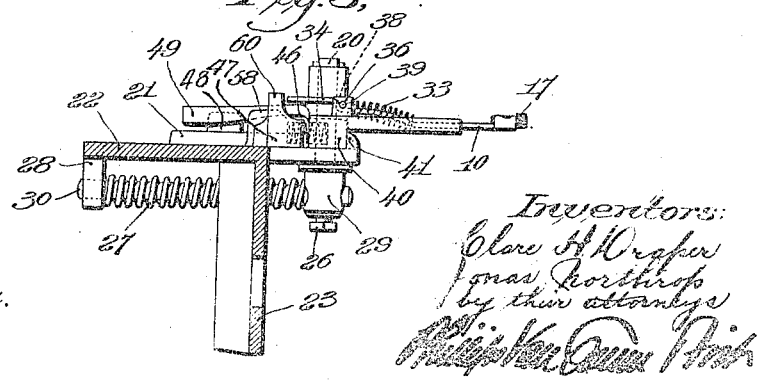

In the accompanying drawings illustrating the preferred form of the invention, Figure 1 is a plan of the improved filling feeler mechanism showing its relation to the shuttle and filling carrier; Fig. 2 is a side elevation, partly in section, of the parts shown in Fig. 1, a portion of the breast beam of the loom to which the filling feeler mechanism is attached being also shown; and Fig. 3 is a sectional elevation on the line 3—3 of Fig. 1.

The improved filling feeler mechanism illustrated in the drawings comprises a filling feeling member or filling feeler which consists of a filling engaging member 10, and a feeler lever 19 upon which the filling engaging member is slidingly and yieldingly mounted. The filling engaging member is adapted to project through the usual slot or opening 11 formed in the front wall of the shuttle 12 to feel for the filling 13, on the filling carrier 14 held by the shuttle spring 15, on the filling feeling beat of the lay 16. This beat-up of the lay occurs while the shuttle is boxed at the end of the lay opposite the filling feeler mechanism. The rearmost or filling feeling end of the filling engaging member 10 is provided with a piece of felt 17, against which the filling strikes on the filling feeling beat. The well-known composition of felt is such that if the filling presses against the felt piece properly, the filling engaging member is prevented from motion relatively thereto; but when the filling is completely exhausted from that part of the filling carrier opposite the filling engaging member and the bare or unwound surface of the filling carrier presses against the felt, a very slight pressure on the filling engaging member in the proper direction will move it relatively to the filling carrier.

The filling engaging member 10 is mounted for sliding movements toward and from the lay 16 on the offset arm 18 of the feeler lever 19 pivoted on a pin 20 fixed in the rear end of a feeler slide 21 mounted for reciprocating movements toward and from the lay on a slide support 22, of which a depending web 23 is secured to a bracket 24 fastened to the breast beam 25 of the loom. The feeler slide and the parts mounted thereon are yieldingly pressed toward the lay, and are normally held in the position shown in Fig. 1, by means of a comparatively heavy compression spring 27 interposed between a web 28 depending from the forward end of the slide support 22 and the lower portion 29 of the pivot pin 20. The spring 27 surrounds and is held in place by a guide rod 30, the forward end of which is loosely received in a hole in the web 28, the rear end of the rod being adjustably secured in the pivot pin extension 29 by means of a set-screw 26. The feeler slide 21 is guided in its reciprocatory movements toward and from the lay by the pivot pin 20 and by a lug 31 extending downwardly from the forward end of the feeler slide. These parts are loosely engaged by a slot 32 formed longitudinally in the slide support 22.

The filling engaging member 10 is yieldingly pressed toward the filling carrier 14 by means of a compression spring 33, of comparatively light tension, which encircles the shank 34 forming the forward end of the filling engaging member, the spring 33 being interposed between the shoulder 35, formed at the junction of the shank and the head of the filling engaging member and the rear side of ears 36 rising from the feeler lever 19. The filling-engaging member is received in guideways or grooves formed on the rearmost end of the arm 18. The limit of movement of the filling engaging member toward the filling carrier is determined by the engagement of a shoulder 38 formed on the shank 34 of the feeler, with a cotter pin 39 passed through the upper ends of the ears 36. The filling engaging member 10 and the feeler lever 19 together constitute the filling feeling member or filling feeler.

On the filling feeling beat of the lay the filling strikes the felt piece 17 on the filling engaging member 10 and pushes it forward against the action of the spring 33 until the shuttle spring 15 comes into contact with the rearmost end of a feeler controller 42, of which the forward end is threaded into a boss 43 projecting laterally from the feeler slide 21. The controller 42 may be turned in the boss 43 to adjust the position of its shuttle spring contacting end relatively to the filling engaging end of the filling engaging member 10, and when it has been so adjusted it is secured in adjusted position by means of a checknut 44. As the lay continues its forward movement the pressure of the shuttle spring 15 upon the controller 42 pushes the feeler slide 21 and the parts carried by it forward. So long as filling remains on that part of the filling carrier opposite the filling engaging member 10, the feeler lever 19 and the filling engaging member 10, that is, the filling feeling member or filling feeler, cannot move on its pivot relatively to the filling carrier when the feeler slide is moved forward on the filling feeling beat of the lay; but when the filling on that part of the filling carrier opposite the filling engaging member has become entirely unwound so as to expose the surface of the filling carrier, and the feeler slide is moved forward, a compression spring 46, of which one end is received in a recess in the forward end of the arm 18 of the feeler lever, and of which the other end is received in a recess in a boss 47 projecting laterally from the feeler slide 21, is permitted to turn the filling feeler about its pivot, thereby causing the rearmost or filling feeling end thereof to travel longitudinally along the unwound surface of the filling carrier toward the carrier butt in engagement with the end winding of the filling. This movement of the feeler is termed its filling feeling movement. Not only is the spring 46 prevented from turning the filling on the filling feeling beat, so long as the felt piece 17 is engaged by filling, but the spring 46 is also prevented from turning the filling feeler while the parts of the feeler mechanism are in normal position, because of the overpowering tension of the spring 27. In normally holding the feeler slide toward the lay, the spring 27 forces a shoulder 40 formed on the arm 18 against a stop lug 41 on the slide support, thereby holding the spring 46 compressed and ineffective. In order to prevent the feeler lever 19 from swinging out of operative position toward the filling carrier tip, a stop lug 48 rising from the side of the slide support 22 is adapted to be engaged by an actuator 49, which constitutes a forwardly extending arm of the feeler lever.

The engagement of the felt piece 17 with the end winding of the filling prevents further swing of the filling feeler. When the filling has been exhausted to a predetermined point from the carrier butt, the filling feeler is permitted to swing far enough to bring the forward end of the actuator arm 49 of the feeler lever 19 opposite the finger 50 of a slide 51 received for sliding movements between two ears 52 rising from the slide support 22. The slide 51 is prevented from displacement by means of a screw 53 passed through the ears 52. On the rearmost end of the slide 51 is adjustably secured a block 55. In engagement with the block 55, during regular weaving, is an arm 56 which is attached to and controls the operation either of devices for stopping the loom or of weft replenishing mechanism. If the filling feeler mechanism is applied to a plain loom, an actuation of the arm 56 results in loom stoppage. If the filling feeler mechanism is applied to a weft replenishing loom, an actuation of the lever 56 results in the insertion of a fresh supply of filling in the shuttle. The arm 56 and its actuating means constitute loom controlling devices. When the actuator arm 49 of the feeler lever 19 has been swung opposite the finger 50 of the slide 51, and the lay continues its forward movement, the block 55 is forced against the arm 56 and pushes it forwardly, thereby causing a change in the operation of the loom. The operative position of the actuator arm 49 relatively to the finger 50 is determined by a stop lug 58 rising from the feeler slide 21.

It will be observed from an inspection of Fig. 1 that the end windings of the filling are built up on a long taper, that the end of the felt piece 17 farthest from the butt of the filling carrier is in engagement with the filling, and that a space separates the filling from the end of the felt piece nearest the butt of the filling carrier. Now, while the filling remains in this condition, that is, until it is unwound, and it strikes the filling engaging member on the filling feeling beat of the lay, the angular relation between the filling and the felt has a tendency to cause the filling feeler to swing about its pivot when the feeler slide has been pushed forward by the pressure of the shuttle spring against the controller 42. Owing to this tendency of the filling feeler to swing about its pivot because of the angular relation between the part of the filling the filling engaging member contacts with and the felt piece 17, premature operation of the parts of the loom controlled by the filling feeler mechanism would result. Accordingly, means are provided for preventing this premature operation of the loom controlling devices. This premature operation preventive means consists of a stop lug or lock 60 which constitutes the apex of the boss 47. When the filling, as shown in Fig. 1, strikes the filling engaging member 10 on the filling feeling beat of the lay, it pushes the filling engaging member forwardly so that the forward end of the shank 34 thereof is brought opposite the lock 60 before the shuttle spring 15 has contacted with the controller 42. Consequently, when the continued forward movement of the lay and the pressure of the shuttle spring against the controller pushes the feeler slide forwardly, and thereby relieves the spring 46 of the overpowering tension of the spring 27, the lock 60 will prevent the spring 46 from swinging the filling feeler about its pivot. This locking action continues so long as the angular relation between the filling and the felt piece 17 continues. But, when the filling opposite the felt piece has become so far exhausted that the shuttle spring strikes the controller at about the same time as, or before, the filling strikes the filling engaging member, that is, when the filling approximates critical exhaustion, the filling engaging member is not pushed forward far enough to bring the forward end of the shank 34 of the filling engaging member opposite the lock 60; consequently, at this time the lock does not prevent the spring 46 from swinging the filling feeler about its pivot.

Having thus described the invention, what is claimed is:—

1. A loom having, in combination, a lay, a shuttle, and a filling feeler mechanism comprising a slide movable toward and from the lay, a feeler controller fixed thereon adapted to contact with the shuttle springs, a feeler lever pivoted on the slide, a filling engaging member yieldingly mounted on the feeler lever and adapted to coöperate with the filling, means for turning the lever when the filling approaches critical exhaustion, and means arranged to coöperate with the filling engaging member for positively preventing the lever from turning until the filling approaches critical exhaustion.

2. A loom having, in combination, a lay, a shuttle, a filling carrier, and a filling feeler mechanism comprising a slide movable toward and from the lay, a feeler lever mounted on the slide, a filling engaging member movably mounted on the feeler lever for coöperation with the filling, means tending to turn the feeler lever, and a lock fixed on the slide adapted to be engaged by the filling engaging member to prevent the turning movements of the feeler lever until the filling approaches critical exhaustion.

3. A loom having, in combination, a lay, a shuttle, a filling carrier, and a filling feeler mechanism comprising a slide movable toward and from the lay, a feeler controller fixed on the slide adapted to be engaged by the shuttle springs, a feeler lever pivoted on the slide, a filling engaging member slidingly mounted on the feeler lever and yieldingly pressed toward the lay and adapted to coöperate with the filling, said filling engaging member being arranged to be moved relatively to the lever a distance at least equal to the depth of the filling on the filling carrier on each filling feeling beat of the lay, means for turning the feeler lever when the filling approximates critical exhaustion, and means for preventing the turning of the feeler lever until the filling approaches critical exhaustion.

4. A loom having, in combination, a lay, a shuttle, a filling carrier, and a filling feeler mechanism comprising a slide movable toward and from the lay, a controller on the slide adapted to be struck by the shuttle on the filling feeling beat of the lay, and a filling feeler consisting of a feeler lever pivotally mounted on the slide and a filling engaging member slidingly mounted on the feeler lever normally extending beyond the controller toward the lay, said filling engaging member being arranged so that it permits the controller to be struck by the shuttle on each filling feeling beat of the lay.

5. A loom having, in combination, a lay, a shuttle, a filling carrier, and a filling feeler mechanism comprising a slide, a feeler controller fixed thereon, a filling feeler consisting of a feeler lever pivoted on the slide, and a filling engaging member slidingly mounted on the feeler lever, and a lock on the slide for preventing pivotal movement of the filling feeler until the filling approximates critical exhaustion.

6. A loom having, in combination, a lay, a shuttle, a filling carrier, and a filling feeler mechanism comprising a slide movable toward and from the lay, a feeler controller fixed thereon adapted to be struck by the lay to move the slide forward, a feeler lever mounted on the slide, means for turning the feeler lever, a filling engaging member slidingly mounted on the feeler lever and adapted to be struck by the filling carrier, and a lock on the slide for preventing the turning of the feeler lever after the slide has been moved forward until the filling approximates critical exhaustion.

7. A loom having, in combination, a lay, a shuttle, a filling carrier, and a filling feeler mechanism comprising a filling feeler adapted to feel of and determine the amount of filling on the filling carrier having a filling engaging end composed of felt.

8. A loom having, in combination, a lay, a shuttle, a filling carrier, and a filling feeler mechanism comprising a slide movable toward and from the lay, a feeler lever pivoted thereon, a filling engaging member slidingly and yieldingly mounted on the feeler lever and adapted to coöperate with the filling, means for turning the feeler lever when the filling approximates critical exhaustion, a feeler controller fixed on the slide, and a lock fixed on the slide adapted to be engaged by the filling engaging member to prevent pivotal movement of the feeler lever until the filling approaches critical exhaustion.

9. A loom having, in combination, a lay, a shuttle, a filling carrier, and a filling feeler mechanism comprising a slide movable toward and from the lay, a controller fixed on the slide adapted to be struck by the shuttle springs, a filling feeler pivoted on the slide adapted to coöperate with the filling, means for turning the filling feeler when the filling approximates critical exhaustion, and means fixed on the slide for preventing the turning of the filling feeler until the filling approaches critical exhaustion.

CLARE H. DRAPER.
JONAS NORTHROP